United States Patent [19]

Zorbalas

[11] 4,296,446
[45] Oct. 20, 1981

[54] MOTOR SPEED CONTROL CIRCUIT
[75] Inventor: George S. Zorbalas, Cherry Hill, N.J.
[73] Assignee: RCA Corporation, New York, N.Y.
[21] Appl. No.: 94,690
[22] Filed: Nov. 15, 1979
[51] Int. Cl.³ .............................................. G11B 15/46
[52] U.S. Cl. ...................................... 360/73; 318/490
[58] Field of Search .......................... 360/73, 37, 10; 318/318, 314, 341, 490

[56] References Cited

U.S. PATENT DOCUMENTS

| 3,893,169 | 7/1975 | Hall, Jr. | 360/37 |
| 4,123,779 | 10/1978 | Goldschmidt | 360/73 X |
| 4,190,860 | 2/1980 | Somers et al. | 360/73 X |
| 4,203,061 | 5/1980 | Minakuchi | 318/490 |
| 4,211,967 | 7/1980 | Akiyama et al. | 318/314 X |

Primary Examiner—John H. Wolff
Attorney, Agent, or Firm—Paul J. Rasmussen; William H. Meise; Henry I. Steckler

[57] ABSTRACT

A motor speed control circuit features a speed synthesizer for accurate speed control. The synthesizer has a phase-locked loop with a programmable divider for allowing variable speeds.

6 Claims, 1 Drawing Figure

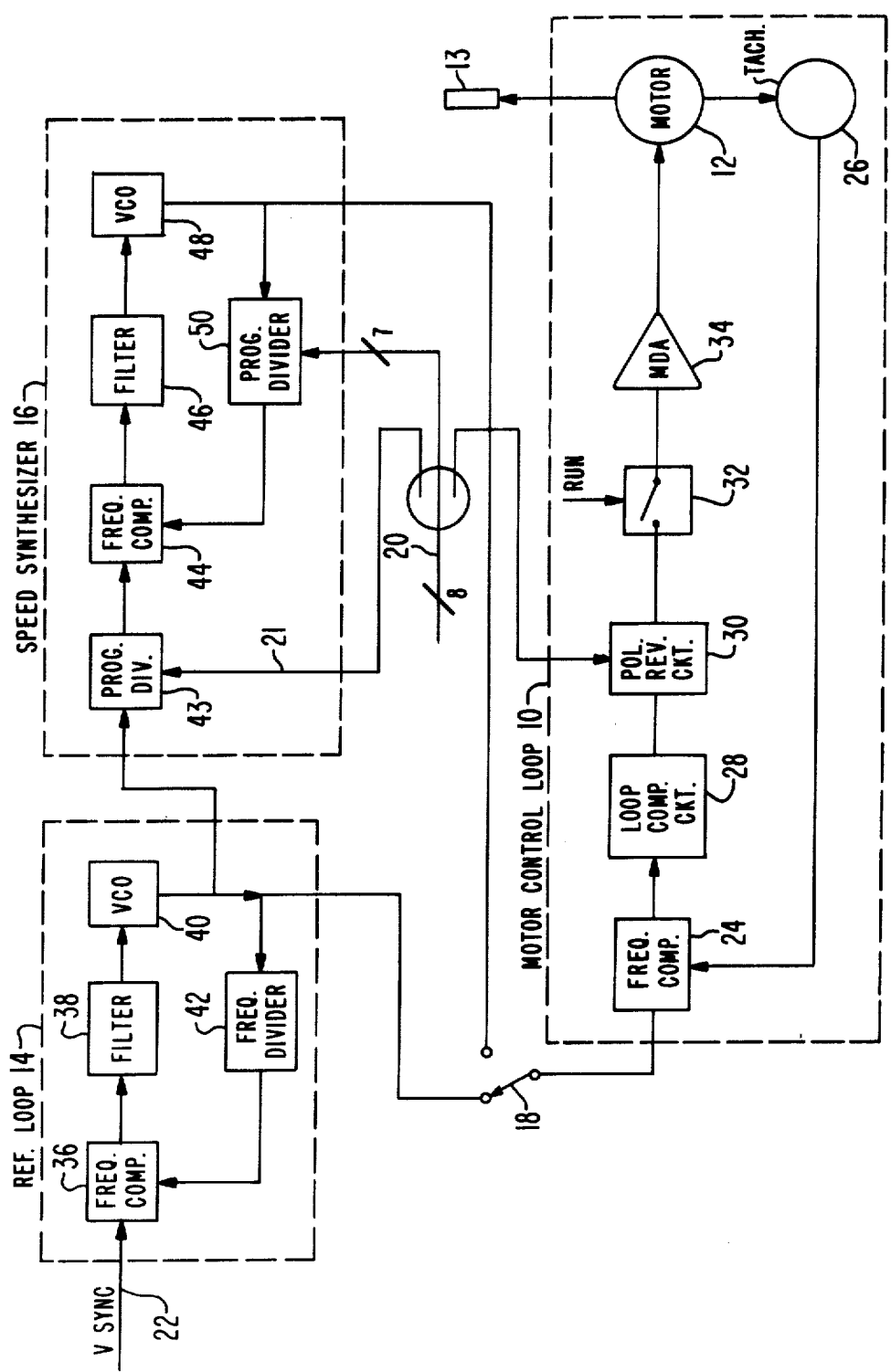

MOTOR SPEED CONTROL CIRCUIT

BACKGROUND OF THE INVENTION

The present invention relates to a motor speed control circuit, and more particularly to one for use with a magnetic recording system.

In doing special effects when using recorded video signals, it is desirable to playback recorded signals at other than standard speeds, so as to be able to speed up or slow down the time of the recorded picture. Up to now it has been difficult to get an accurate and repeatable speed for the video playback machine.

It is therefore desirable to have a capstan motor speed control circuit that it highly accurate and reproduceable.

SUMMARY OF THE INVENTION

In brief, this is achieved by having a speed synthesizer that responds to a digital speed command signal and produces the proper input signal to a circuit which controls the motor speed. A reference signal is applied to the speed synthesizer. The circuit which controls the motor speed is a phase-locked loop, which receives its reference signal from the synthesizer output when a variable speed mode is activated.

DESCRIPTION OF THE DRAWINGS

The sole FIGURE is a block diagram of the invention.

DETAILED DESCRIPTION

In general the invention comprises a motor control loop and drive circuit 10 used for controlling the speed of a motor 12, which in turn has a capstan 13 coupled to it. A speed control signal is applied to motor drive circuit 10 from either a reference loop 14, if it is desired to use normal playback speed, or a speed synthesizer 16, if it is desired to operate at other than a normal playback speed. The selection between the two is done by switch 18. The speed synthesizer 16 receives speed command signals from a bus 20, while the reference loop 14 receives vertical synchronization pulses from a line 22 so as to be able to supply a reference signal that is in synchronization with the vertical synchronization pulses.

The invention will now be described in more detail. The motor drive circuit 10 comprises frequency comparator 24, which comprises a phase comparator for providing an output signal if the frequency or phase of input signals differ. Comparator 24 receives a speed control signal from switch 18 at one input and a signal from tachometer 26 representative of the speed of motor 12 at another input. An output signal from comparator 24 is applied to a loop compensation circuit 28. This circuit is a lead-lag filter, which is necessary, to stabilize the motor drive circuit which comprises a control loop. The output signal from circuit 28 is then applied to a polarity reversing circuit 30 which has a control input from bus 20 that will reverse the current appearing at its output, thus controlling the direction of rotation of motor 12. Reversing circuit 30 can comprise relays or a solid state switch. The output from circuit 30 is applied to a switch 32 which receives at its input a RUN command. This command typically comes from an operator control button. The output of switch 32 is applied to a motor drive amplifier (MDA) 32. This amplifier does not supply any current at its output when the switch 32 is open, and thus when switch 32 is open, there will be no actuation of the motor 12. Further amplifier 34 is of the class AB type with current feedback to provide a constant current drive to motor 12.

Reference loop 14 comprises a frequency and phase comparator 36 which receives at a first input a vertical synchronization signal. The output of comparator 36 is applied to a filter 38 for proper compensation of the reference loop 14. The output of the filter 38 is applied to a voltage controlled oscillator (VCO) 40, which in turn applies its output to a frequency divider 42. Divider 42 provides a frequency divided output signal to a second input of the frequency comparator 36. When switch 18 is in its left hand position, divider 42 will also apply the output signal from VCO 40 to frequency comparator 24. In a particular embodiment, the tachometer 26 provides an approximately 6 kHz output signal when the motor is running at normal speed. Since the input at frequency comparator 24 coming from VCO 40 must have the same frequency as that applied from tachometer 26, a division ratio of 102 is chosen for a divider 42 for an NTSC system. This will cause the VCO frequency to be approximately 6 kHz, which is 102 times the vertical sync frequency of 59.94 Hz being applied on input line 22 to reference loop 14. For a PAL-D system, which uses a 50 Hz vertical sync frequency, the division factor of frequency divider 42 must be 120. The output of VCO 40 is also applied to speed synthesizer 16, in particular a programmable divider 43, whose operation is controlled by line 21, which decodes the highest two significant bits of bus 20. For NTSC, divider 43 divides the frequency of the signal from VCO 40 by 60 for proper scaling. Above a certain speed, line 21 causes the division ratio to be altered from 60 to 30. For a PAL-B system, the numbers would be 50 and 25 respectively. The output of divider 43 is applied to a frequency comparator 44. The output of the comparator 44 is applied to a smoothing and loop compensation filter 46 and from there to a voltage controlled oscillator 48. The voltage controlled oscillator 48 output signal is applied to a programmable divider 50, as well as to the right side contact of switch 18. The programmable divider 50 has applied to it a seven bit speed control command signal present on bus 20 and applies frequency divided output signals to the frequency comparator 44. It will be seen that the actual frequency of VCO 48 will depend upon the division factor of divider 50, which in turn is dependent upon the speed command control signal applied to it from bus 20.

In operation, if it is desired to record or to playback at a normal speed, the switch 18 is thrown to its left hand position as shown in the drawing. Thus the signal from VCO 40 will be applied to the motor control loop 10 and there compared with the output signal from tachometer 26 by frequency comparator 24. If the motor 12 is rotating at the conventional speed, comparator 24 will provide a selected D.C. voltage so that there will be a current supplied to motor 12 by amplifier 34 of a proper amount to maintain that speed. If the motor deviates from the normal speed, the frequency of the signal from tachometer 26 will deviate from 6 kHz, thus causing a different D.C. output signal from comparator 24 from what was being provided before, and hence, a different current from motor drive amplifier 34 to cause the speed of motor 12 to either speed up or slow down until it returns to the normal speed. The direction of rotation can be controlled by the direction of command signal applied to polarity reversing circuit 30. If it is desired to playback at other than the normal standard speed, then switch 18 is thrown to its right hand position as shown in the FIGURE and the speed will be controlled by the frequency of the signal provided by VCO 48. This in turn is dependent upon the division factor in divider 50, and in turn upon the digital speed control signals on bus 20 applied to divider 50. The speed control signals on bus 20 may be derived from any of a variety of sources. For example, it can be a typewriter type keyboard that provides the signals, a variable potentiometer which applies a voltage to analog to digital converter, or from a microprocessor.

It will be appreciated that the above invention, because of the digital nature of the signals applied to programmable divider 50, provides a highly accurate and repeatable speed control for the motor 12.

What is claimed is:

1. A circuit for controlling the speed of a motor, said circuit comprising:
   a speed synthesizer having first input means for receiving a digital speed command signal, a second input means, and an output means for supplying a variable speed control signal;
   a means for supplying a reference signal to said second input means;
   a motor drive circuit having an input means for receiving said variable speed control signal and adapted to be coupled to said motor for speed control thereof; and
   wherein said speed synthesizer comprises a frequency comparator having a first input coupled to said reference signal means, a second input, and an output;
   a filter coupled to said comparator output;
   a voltage controlled oscillator having a control input coupled to said filter and an output; and
   a programmable divider having an input coupled to said oscillator output, a control input comprising said synthesizer first input means for receiving said digital speed command signal, and an output coupled to said frequency comparator second input.

2. A circuit as claimed in claim 1, further comprising switch means coupled to said speed synthesizer output means, said reference signal supplying means, and said motor drive circuit for providing selection between said reference signal means and said synthesizer for control of said motor drive circuit and hence said motor.

3. A circuit as claimed in claim 1, wherein said reference signal supplying means comprises a frequency comparator having a first input means for receiving a synchronization signal, a second input, and an output;
   a filter coupled to said output;
   a voltage controlled oscillator having a control input coupled to said filter and an output; and
   a frequency divider having an input coupled to said oscillator output, and an output coupled to said comparator second input.

4. A circuit as claimed in claim 4, wherein said synchronization signal comprises a vertical synchronization signal.

5. A circuit as claimed in claim 1, wherein said motor drive circuit comprises:
   a frequency comparator having a first input means for receiving one of a normal speed control signal and said variable speed control signal, a second input, and an output;
   a loop compensation filter coupled to said comparator output;
   a motor drive amplifier coupled to said filter and adapted to be coupled to the motor; and
   a tachometer having an input adapted to be coupled to said motor, and an output coupled to said comparator second input.

6. A circuit as claimed in claim 1, further comprising said motor, said motor having a capstan mounted thereto.

* * * * *